United States Patent
Nonobe (10) Patent No.: US 8,142,939 B2
(45) Date of Patent: Mar. 27, 2012

(54) FUEL CELL SYSTEM AND METHOD FOR CONTROLLING FUEL CELL SYSTEM

(75) Inventor: Yasuhiro Nonobe, Aichi-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 928 days.

(21) Appl. No.: 12/081,336

(22) Filed: Apr. 15, 2008

(65) Prior Publication Data
US 2008/0261089 A1    Oct. 23, 2008

(30) Foreign Application Priority Data
Apr. 17, 2007   (JP) .................... 2007-108355

(51) Int. Cl.
*H01M 8/06* (2006.01)
(52) U.S. Cl. ......... 429/415; 417/443; 417/448; 417/449
(58) Field of Classification Search .............. None
See application file for complete search history.

(56) References Cited

U.S. PATENT DOCUMENTS

| | | | | |
|---|---|---|---|---|
| 6,124,054 A * | 9/2000 | Gorman et al. | ............... | 429/408 |
| 6,408,966 B1 * | 6/2002 | Benz et al. | .................... | 180/65.1 |
| 6,461,751 B1 * | 10/2002 | Boehm et al. | .................. | 429/432 |
| 6,638,652 B1 * | 10/2003 | Motozono et al. | ............ | 429/423 |
| 6,861,167 B2 * | 3/2005 | Wells et al. | .................... | 429/432 |

FOREIGN PATENT DOCUMENTS

| | | |
|---|---|---|
| JP | 9-312167 | 12/1997 |
| JP | 2004-319318 | 11/2004 |

* cited by examiner

*Primary Examiner* — Cynthia Lee
(74) *Attorney, Agent, or Firm* — Finnegan, Henderson, Farabow, Garrett & Dunner, LLP (57) ABSTRACT

In a fuel cell unit that generates electric power using fuel gas supplied via an anode gas passage and air supplied via a cathode gas passage, an anode-off gas passage is connected to the downstream side of the anode gas passage. An orifice is provided at the anode-off gas passage and anode-off gas is discharged to the downstream side via the orifice.

19 Claims, 5 Drawing Sheets

FUEL CELL SYSTEM AND METHOD FOR CONTROLLING FUEL CELL SYSTEM

INCORPORATION BY REFERENCE

The disclosure of Japanese Patent Application No. 2007-108355 filed on Apr. 17, 2007, including the specification, drawings and abstract is incorporated herein by reference in its entirety.

BACKGROUND OF THE INVENTION

1. Field of the Invention

The invention relates to a fuel cell system that generates electric power using fuel gas supplied to an anode and air supplied to a cathode and to a method for controlling such a fuel cell system.

2. Description of the Related Art

Japanese Patent Application Publication No. 09-312167 (JP-A-09-312167) describes a fuel cell system that performs power generation with fuel gas being retained in an anode-side gas passage (will be referred to as "anode-dead-end type fuel cell system"). In this fuel cell system, a fuel supply valve is provided in the upstream side of the anode-side gas passage and a gas-discharge valve is provided in the downstream side of the anode-gas passage.

The amount of fuel gas required to be supplied to the fuel cell unit changes depending upon the value of the power output required of the fuel cell unit, and so on. Therefore, the fuel supply valve is controlled such that an appropriate amount of fuel gas is supplied to the fuel cell unit. Further, in anode-dead-end type fuel cell systems, impurities, such as nitrogen and water, accumulate in the anode-side gas passage as the operation of the fuel cell unit continues. In anode-dead-end type fuel cell systems, therefore, the gas-discharge valve is opened at a given timing or intermittently so as to discharge the impurities accumulating in the anode-side gas passage to the outside via the downstream end of the anode.

In the above-described fuel cell system, valve mechanisms are provided in the upstream side and the downstream side of the anode, respectively, and controlled so as to maintain a good power generation state of the fuel cell unit. However, in view of improving the system reliability and ensuring a high robustness, it is desirable to make the system configuration as simple as possible.

SUMMARY OF THE INVENTION

The invention provides a simplified fuel cell system and a method for controlling the same.

The first aspect of the invention relates to a fuel cell having an anode and a cathode and operable to generate electric power using fuel gas supplied to the anode and cathode gas supplied to the cathode; and a gas passage in which anode-off gas discharged from the anode flows and which has an orifice.

Owing to the orifice of the gas passage, gas is discharged to the outside at a very low flow rate for the amount of fuel gas consumed in the anode. Thus, with such a relatively simple system configuration, the impurities accumulating in the downstream side of the anode can be discharged to the outside while minimizing the amount of fuel gas discharged.

The above-described fuel cell may further have a fuel supply mechanism provided upstream of the anode and operable to adjust the amount of fuel gas supplied to the anode, wherein the fuel supply mechanism includes an injector.

According to this structure, because fuel gas is supplied via the injector, the fuel gas supply amount can be adjusted with a high accuracy.

The above-described fuel cell may further have a fuel supply mechanism provided upstream of the anode and operable to adjust the amount of fuel gas supplied to the anode; a detector that detects the fuel concentration in gas flowing in the gas passage; and a fuel supply amount control portion that controls the fuel-supply mechanism to adjust the amount of fuel gas supplied to the anode based on the fuel concentration detected by the detector.

According to this structure, the amount of fuel gas discharged to the downstream side of the orifice can be adjusted by controlling the fuel supply mechanism while monitoring the fuel concentration in gas discharged to the downstream side of the anode. The gas discharged from the anode contains fuel gas as well as impurities. However, according to the structure described above, not only simplifying the system structure using an orifice, the fuel concentration in gas contained in the discharged gas is prevented from increasing to an excessive level, and thus the impurities in the anode can be discharged properly.

Further, the above-described fuel cell system may further have a cathode passage line including the cathode of the fuel cell and operable to communicate, at one end, with the outside of the cathode passage line, wherein a portion of the gas passage which is located downstream of the orifice is connected to the cathode passage line.

According to this structure, when discharging the impurities in the anode, the fuel gas contained in the gas to be discharged is mixed with air and then discharged to the outside. As such, it is possible to prevent that a gas containing high-concentration fuel gas is discharged to the outside.

Further, the above fuel cell system may further have an air supply mechanism provided upstream of the cathode and operable to adjust the amount of air supplied to the cathode as the cathode gas; a detector that detects the fuel concentration in gas flowing in the gas passage; and an air supply amount control portion that controls the air supply mechanism to adjust the air supply amount based on the fuel concentration detected by the detector such that the fuel concentration in gas discharged from the cathode passage line becomes equal to or lower than a reference value.

According to this structure, the fuel concentration in the anode-off gas discharged from the anode toward the downstream side is monitored, and the fuel concentration in the gas discharged to the outside is prevented from increasing to an excessive level.

Further, the above-described fuel cell system may further have a first calculation portion that calculates a first air supply amount that is the amount of air required to be supplied via the air supply mechanism to make the fuel concentration in gas discharged from the cathode passage line equal to or lower than the reference value; and a second calculation portion that calculates a second air supply amount that is the amount of air required to be supplied via the air supply mechanism to produce a required power output of the fuel cell, wherein the air supply amount control portion includes a comparative control portion that controls the air supply mechanism based on a result of comparison between the calculated first air supply amount and the calculated second air supply amount.

According to this structure, the supply of air of the amount necessary for power generation and the reduction of the fuel concentration in the gas discharged to the outside can be both accomplished advantageously.

The second aspect of the invention relates to a method for controlling a fuel cell system having an anode-off gas passage through which anode-off gas discharged from an anode of a fuel cell flows and which has an orifice. This method includes the steps of: obtaining the fuel concentration in gas discharged from the fuel cell system; and adjusting the amount of fuel gas to be supplied to the fuel cell based on the obtained the fuel concentration.

The third aspect of the invention relates to a method for controlling a fuel cell system in which an anode-off gas passage in which anode-off gas discharged from an anode of a fuel cell flows and a cathode passage in which cathode gas flows are in communication with each other via an orifice. This method includes the steps of: obtaining the fuel concentration in gas discharged from the fuel cell system; and adjusting, based on the obtained fuel concentration, at least one of the amount of fuel gas supplied to the fuel cell and the amount of cathode gas supplied to the fuel cell.

The fourth aspect of the invention relates to a method for controlling a fuel cell system in which an anode-off gas passage in which anode-off gas discharged from an anode of a fuel cell flows and a cathode passage in which cathode gas flows are in communication with each other via an orifice. This method includes the steps of: determining whether a portion of the anode gas passage upstream of the orifice needs to be purged; and increasing the amount of cathode gas to be supplied to the fuel cell when it has been determined that the portion of the anode gas passage needs to be purged.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF THE EMBODIMENTS

Configuration of First Example Embodiment

Figure 1:
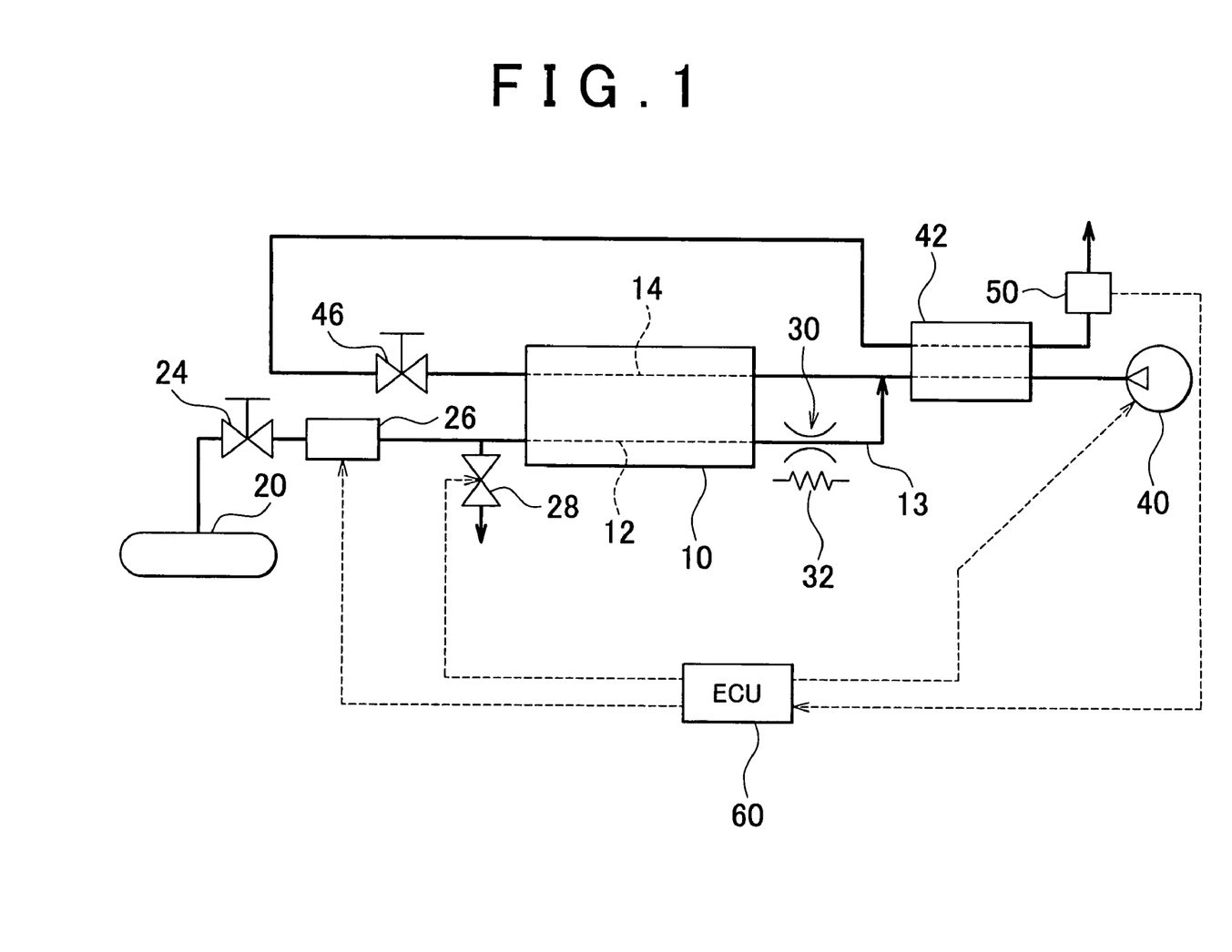
FIG. 1 is a view showing the configuration of a fuel cell system according to the first example embodiment of the invention.

FIG. 1 is a view schematically showing the configuration of a fuel cell system according to the first example embodiment of the invention. This fuel cell system is provided with a fuel cell unit 10. The fuel cell unit 10 is a fuel cell stack constituted of a plurality of fuel cells stacked on top of each other. Although not shown in the drawings, each fuel cell is constituted of a membrane-electrode assembly and a pair of collector plates sandwiching the membrane-electrode assembly.

Each membrane-electrode assembly is constituted of a solid polymer electrolyte membrane, catalytic portions integrally provided on the both sides of the same membrane, and gas diffusion layers formed of carbon sheets, etc., and integrally provided on the outer sides of the respective catalytic portions. Each collector plate serves also as a separator partitioning between two membrane-electrode assemblies adjacent to each other. Hydrogen is supplied to the anode of each fuel cell as fuel gas while air is supplied to the cathode, whereby electric power is generated.

Referring to FIG. 1, the fuel cell unit 10 has an anode gas passage 12 and a cathode gas passage 14. Note that the stack structure of the fuel cell unit 10 is not shown in FIG. 1 for description convenience. That is, because the fuel cell unit 10 is constituted of a plurality of fuel cells stacked on top of each other, the anode gas passage 12 actually includes the anode gas passages of the respective fuel cells and an anode manifold via which the anode gas passages of the respective fuel cells converge, and the cathode gas passage 14 actually includes the cathode gas passages of the respective fuel cells and a cathode manifold via which the cathode gas passages of the respective fuel cells converge.

More specifically, the anode gas passage 12 is an anode gas passage extending throughout the fuel cell unit 10 and including the anode gas passages provided in the anodes of the respective fuel cells and the anode gas manifold, and the cathode gas passage 14 is a cathode gas passage extending throughout the fuel cell unit 10 and including the cathode gas passages provided in the cathodes of the respective fuel cells and the cathode manifold. It is to noted that in the following descriptions the side of the anode gas passage 12 to which hydrogen is supplied during power generation is the "upstream" side of the anode gas passage 12, while the side of the cathode gas passage 14 to which air is supplied during power generation is the "upstream" side of the cathode gas passage 14".

The upstream end of the anode gas passage 12 is connected to a fuel tank 20 via an injector 26 and a pressure adjustment valve 24. In the fuel tank 20, hydrogen is stored at a high pressure. The pressure adjustment valve 24 depressurizes hydrogen supplied from the fuel tank 20 down to a given pressure and then delivers the depressurized hydrogen to the downstream side. This hydrogen is then supplied from the injector 26 to the anode gas passage 12.

The open duration of the injector 26 can be variably controlled, and the injector 26 has a high-frequency response and therefore provides a high flow-rate control accuracy. As such, the injector 26 enables a more accurate fuel supply than valves providing only variable valve lift control. When the injector 26 is closed, the supply of hydrogen to the anode gas passage 12 is stopped. A purge valve 28 is provided between the injector 26 and the inlet of the anode gas passage 12. The purge valve 28 is opened at a given timing, whereby the passage including the anode gas passage 12 is placed in communication with a gas discharge passage downstream of the purge valve 28, which is not shown in the drawings.

The downstream end of the anode gas passage 12 is connected to an anode-off gas passage 13. During power generation of the fuel cell unit 10, anode-off gas is discharged from the anode of each fuel cell to the anode-off gas passage 13. The anode-off gas passage 13 has an orifice 30, the diameter of which is such that the amount of gas discharged to the downstream side via the orifice 30 is very small as compared to the amount of hydrogen consumed in the anode gas passage 12. In anode-dead-end type fuel cell systems, impurities including nitrogen and water accumulate as the operation of the fuel cell system continues, and excessive accumulation of such impurities is not desirable for proper power generation in the fuel cell system. According to the example embodiment, however, as gas is continuously discharged to the downstream side of the orifice 30 at a low flow rate as mentioned above (continuous low-rate gas-discharge), the impurities accumulating in the anode gas passage 12 can be discharged while minimizing the amount of hydrogen to be discharged.

A heater 32 is provided in the vicinity of the orifice 30. Energizing the heater 32 increases the temperature at the orifice 30 and the temperature of the atmosphere around the orifice 30. As such, if necessary (e.g., if the fuel cell system is used at a temperature below zero), the orifice 30 and its peripheral portions are prevented from being frozen due to water (e.g., the water produced through the reactions at the fuel cell unit 10) entering the anode-off gas passage 13, or the like.

The upstream end of the cathode gas passage 14 is connected to an air compressor 40 via a humidifier 42. The air compressor 40 takes air in via an air inlet (not shown in the drawings) and discharges it to the humidifier 42 side. The air is then humidified at the humidifier 42 as the air flows therethrough, and the humidified air is then delivered to the cathode gas passage 14. A pressure adjustment valve 46 is provided in the downstream side of the cathode gas passage 14. The gas pressure on the upstream side of the pressure adjustment valve 46 can be changed by controlling the pressure adjustment valve 46.

The pressure adjustment valve 46 communicates, on the downstream side thereof, with a gas-discharge passage line, which is not shown in the drawings, via the humidifier 42 and a hydrogen concentration sensor 50. Water is produced during the power generation of the fuel cell unit 10. This water is carried by the gas flowing in the cathode gas passage 14 toward the downstream side (cathode-off gas) and then delivered into the humidifier 42. Using this water, the humidifier 42 humidifies the air supplied from the air compressor 40 mentioned above.

The output of the hydrogen concentration sensor 50 changes depending upon the amount of hydrogen contained in the gas discharged from the humidifier 42. Thus, the concentration of hydrogen in the gas discharged to the gas-discharge passage line (not shown in the drawings) can be monitored by the hydrogen concentration sensor 50.

Thus, in the fuel cell system of the first example embodiment, the downstream side of the orifice 30 is connected to the upstream portion of the cathode gas passage 14. As such, the anode-off gas flows from the anode-off gas passage 13 to the cathode gas passage 14.

As mentioned above, the orifice 30 is designed so as to discharge the impurities accumulating in the anode gas passage 12 while minimizing the amount of hydrogen to be discharged. However, the gas discharged to the downstream side of the orifice 30 contains, as well as the impurities, some hydrogen that was not used for the power generation in the anode gas passage 12 (will be referred to as "residual hydrogen"). In the fuel cell system of the first example embodiment, such residual hydrogen is delivered into the cathode gas passage 14 and then reacts with oxygen in the air. Thus, the residual hydrogen is not discharged to the outside.

Further, the electrolyte membranes of the respective fuel cells of the fuel cell unit 10 exhibit a proper electric characteristic when they are moistened moderately. In view of this, typical fuel cell systems are normally provided with a humidifier, such as the humidifier 42 of the fuel cell system of the first example embodiment. According to the fuel cell system of the first example embodiment, further, water is produced at the cathode of each fuel cell using the residual hydrogen, and the electrolyte membrane is moistened using such water. Further, during the aforementioned continuous low-rate gas-discharge operation in the fuel cell system of the first example embodiment, the residual hydrogen continuously flows into the cathode gas passage 14 at a very low flow rate, making the supply amount of the residual hydrogen appropriate for achieving stable humidification of the electrolyte membranes. According to this fuel cell system, therefore, the humidifier 42 can be made smaller in size or can even be removed if appropriate.

The fuel cell system of the first example embodiment is provided with an ECU (Electronic Control Unit) 60. The ECU 60 is connected to the injector 26, the purge valve 28, the air compressor 40, and the hydrogen concentration sensor 50. Further, although not shown in the drawings, the ECU 60 is connected to the pressure adjustment valves 24, 46 and the heater 32. Further, although not shown in the drawings, the fuel cell system of the first example embodiment is provided with various sensors for obtaining various information regarding the operation state of the fuel cell unit 10 (e.g., temperature, power output, the value of power output required of the fuel cell unit 10). The ECU 60 is connected to these sensors and determines, based on the outputs from these sensors, the amounts of hydrogen and air to be supplied to the fuel cell unit 10 and controls the injector 26 and the air compressor 40 according to these amounts.

Operation of Fuel Cell System of First Example Embodiment (Normal operation) During the operation of the fuel cell system of the first example embodiment, hydrogen is supplied to the fuel cell unit 10 from the fuel tank 20 while air is supplied to the fuel cell unit 10 from the air compressor 40, whereby electrochemical reactions occur in the fuel cell unit 10 and thus electric power is generated. During this time, the anode-off gas and the cathode-off gas are discharged to the downstream side of the anode gas passage 12 and to the downstream side of the cathode gas passage 14, respectively.

As mentioned above, in the first example embodiment, the anode-off gas passage 13 has the orifice 30 that is designed such that gas is discharged to the downstream side via the orifice 30 at a very low flow rate. According to the first example embodiment, thus, it is possible to discharge the impurities in the anode gas passage 12 while minimizing the amount of hydrogen to be discharged without making the system configuration complicated.

(Control based on hydrogen concentration) The fuel cell system of the first example embodiment is provided with the hydrogen concentration sensor 50. In the fuel cell system of the first example embodiment, the concentration of hydrogen in gas discharged to the gas-discharge passage line, which is not shown in the drawings, is kept at a reference value or smaller using the hydrogen concentration sensor 50. This reference value has been set to a given value (e.g., a value sufficiently smaller than an allowable limit of hydrogen concentration) and stored in the ECU 60 in advance. The hydrogen concentration sensor 50 compares the hydrogen concentration obtained based on the output of the hydrogen concentration sensor 50 with the reference value. If the hydrogen concentration detected by the hydrogen concentration sensor 50 is higher than the reference value, it is determined that the hydrogen concentration needs to be reduced, and the following control is executed.

In the fuel cell system of the first example embodiment, when it has been determined that the hydrogen concentration needs to be reduced, the amount of air supplied from the air compressor 40 is first increased. Because the downstream side of the orifice 30 is connected to the upstream portion of the cathode gas passage 14 as mentioned above, as the amount of air supplied from the air compressor 40 is increased, the amount of reaction between the residual hydrogen and the oxygen in the cathode gas passage 14 increases. Further, as the air amount increases, the residual hydrogen is attenuated. As such, the hydrogen concentration in the gas discharged to the outside can be reduced by increasing the amount of air supplied from the air compressor 40.

Further, in the fuel cell system of the first example embodiment, when it has been determined that the hydrogen concentration needs to be reduced, the injector 26 is controlled so as to reduce the amount of hydrogen supplied to the anode gas passage 12. In this way, the amount of fuel gas discharged to the downstream side of the orifice 30 is adjusted through control for the fuel-supply section, not control for the gas-discharge section. According to the fuel cell system of the first example embodiment, as such, it is possible to simplify the system control procedure as well as the system configuration.

In view of reliability, the smaller the number of movable parts or the smaller the number of objects to be controlled, the more desirable the system configuration is. Further, in the case where the fuel cell system is started or operated at a temperature below zero, some portions downstream of the anode gas passage 12 may be frozen due to the water in the gas flowing from the anode gas passage 12 toward the downstream side. In such a case, there is a possibility that the controllability of each movable part decreases and thus the reliability of the entire system decreases accordingly.

However, owing to the orifice 30 and the above-described control of the injector 26, the fuel cell system of the first example embodiment has a simple configuration and a simple control procedure, thus achieving a high reliability and a high robustness. Meanwhile, the injector 26 can be controlled by changing the duty ratio for the injector 26, reducing the injection pressure of the injector 26, and so on.

(Adjustment of air supply amount) Further, in the fuel cell system of the first example embodiment, air is effectively supplied to the fuel cell unit 10 in the following manner. As mention above, in the fuel cell system of the first example embodiment, the amount of air supplied from the air compressor 40 influences the concentration of hydrogen in the gas discharged to the outside. Therefore, it is desirable to adjust the amount of air supplied from the air compressor 40 such that the concentration of hydrogen in the gas discharged to the outside falls in a proper range. The amount of air used for the power generation of the fuel cell unit 10 is independent of the air amount determined from the limit on the concentration of hydrogen in the gas discharged to the outside. As such, in view of ensuring smooth power generation of the fuel cell unit 10, it is desirable to secure the necessary amount of air for power generation.

Therefore, in the fuel cell system of the first example embodiment, the following method is employed to satisfy the foregoing two requirements. That is, in the fuel cell system of the first example embodiment, because gas is discharged from the anode gas passage 12 via the orifice 30, the amount of gas that passes through the orifice 30 depends on the pressure difference at the orifice 30. In view of this, in the fuel cell system of the first example embodiment, the amount of gas that passes through the orifice 30 is determined based on the pressure in the anode passage line including the anode gas passage 12 and the cathode passage line including the cathode gas passage 14, and based on the determined gas amount, the amount of residual hydrogen flowing into the cathode passage line is determined, and the amount of air required to be supplied to reduce the hydrogen concentration is determined in accordance with the determined residual hydrogen amount.

Further, in the fuel cell system of the first example embodiment, various sensors, and the like, which are used to obtain the state of power generation of the fuel cell unit 10 are connected to the ECU 60. The ECU 60 calculates the amount of air required to be supplied to the cathode gas passage 14 in accordance with the value of power output required of the fuel cell unit 10, and the ECU 60 determines the amount of air needed for the power generation of the fuel cell unit 10 accordingly.

Then, the calculated amount of air required to be supplied to reduce the hydrogen concentration and the calculated amount of air required to be supplied for power generation are compared with each other, and air of the larger of these amount is actually supplied. In this manner, the hydrogen concentration in the gas discharged to the outside is maintained at least at or below the reference value while the air amount supplied to the cathode gas passage 14 is maintained at least at the minimum necessary level for power generation. According to the first example embodiment, as such, owing to such a very simple orifice-based structure, the supply of air of the amount necessary for power generation and the reduction of the concentration of fuel gas in the gas discharged to the outside can be both accomplished advantageously.

(Control during purging) In the fuel cell system of the first example embodiment, through the above-described continuous low-rate gas-discharge operation, the impurities in the anode gas passage 12 are discharged while minimizing the amount of hydrogen to be discharged. On the other hand, there are cases where the impurities in the anode gas passage 12 need to be purged. Thus, in the fuel cell system of the first example embodiment, in response to a purge requirement being made, the purge valve 28 is opened to perform purging.

When performing purging, more specifically, the injector 26 is first closed to stop the hydrogen supply from the fuel tank 20, and then the purge valve 28 is opened and the opening of the pressure adjustment valve 46 is narrowed down so that the pressure in the cathode side increases. As mentioned above, the downstream side of the orifice 30 is connected to the upstream portion of the cathode gas passage 14, that is, in the fuel cell system of the first example embodiment, the anode passage line and the cathode passage line communicate with each other via the orifice 30.

With the hydrogen supply having been stopped and the pressure in the cathode passage line having been increased, the pressure on the cathode side of the orifice 30 becomes higher than the pressure on the anode side of the orifice 30, whereby air starts flowing from the cathode side, the high pressure side, to the anode side, the low-pressure side. This air proceeds in the anode gas passage 12 and then is discharged to the outside via the purge valve 28, whereby impurities, such as water, in the anode gas passage 12 are removed.

Control Routines of First Example Embodiment

Figure 2:
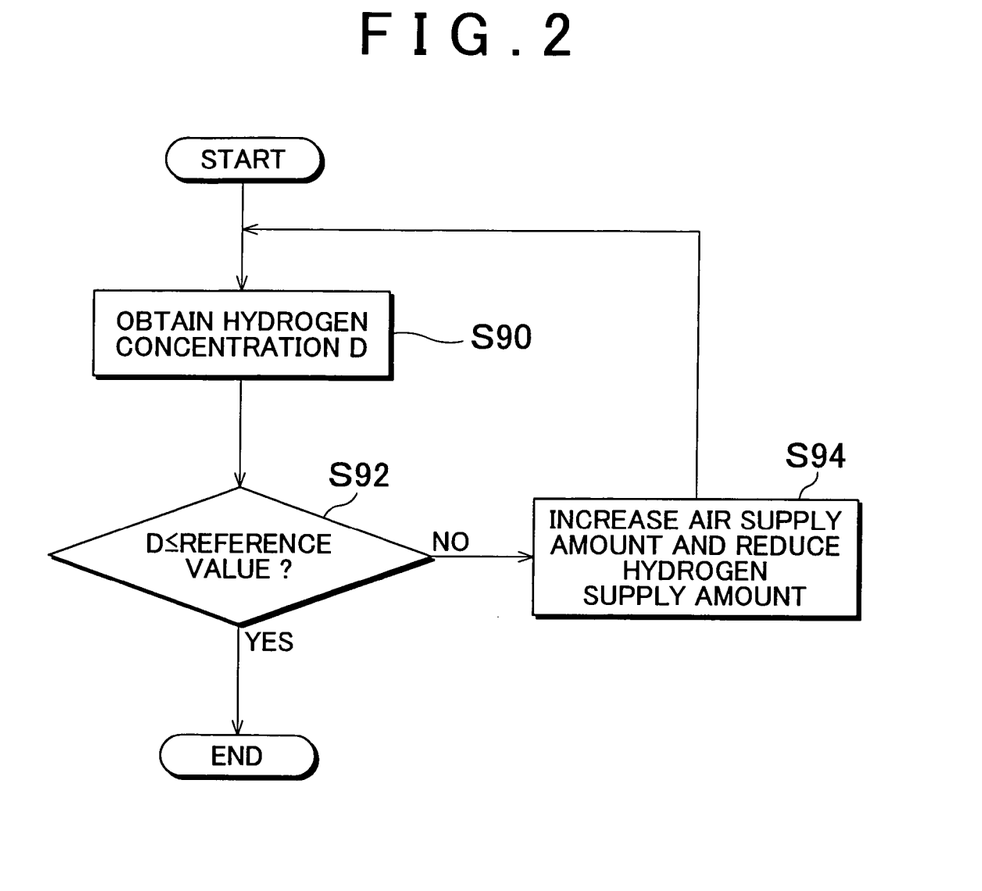
FIG. 2 is a flowchart illustrating the first control routine executed in the fuel cell system of the first example embodiment of the invention.
Figure 3:
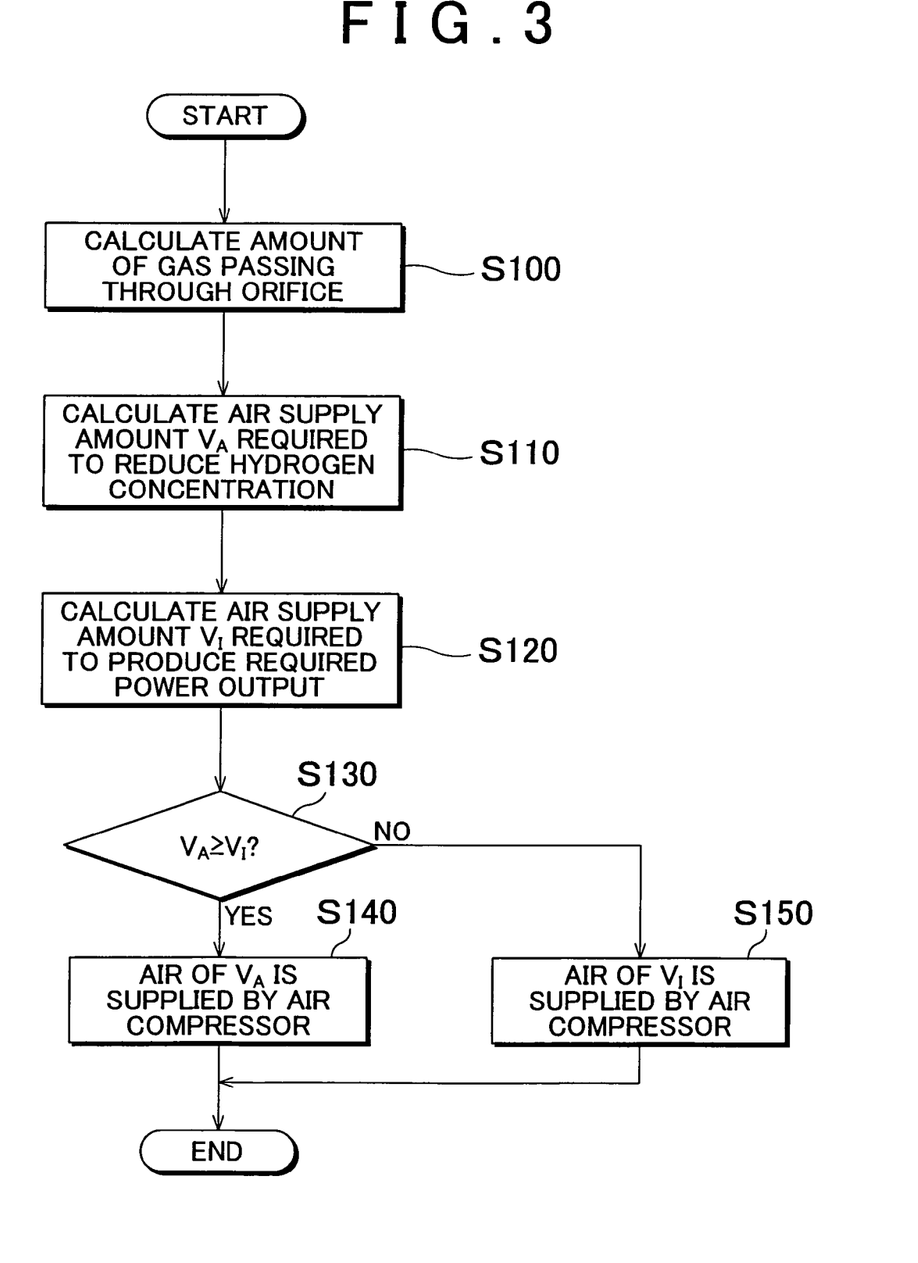
FIG. 3 is a flowchart illustrating the first control routine executed in the fuel cell system of the second example embodiment of the invention.
Figure 4:
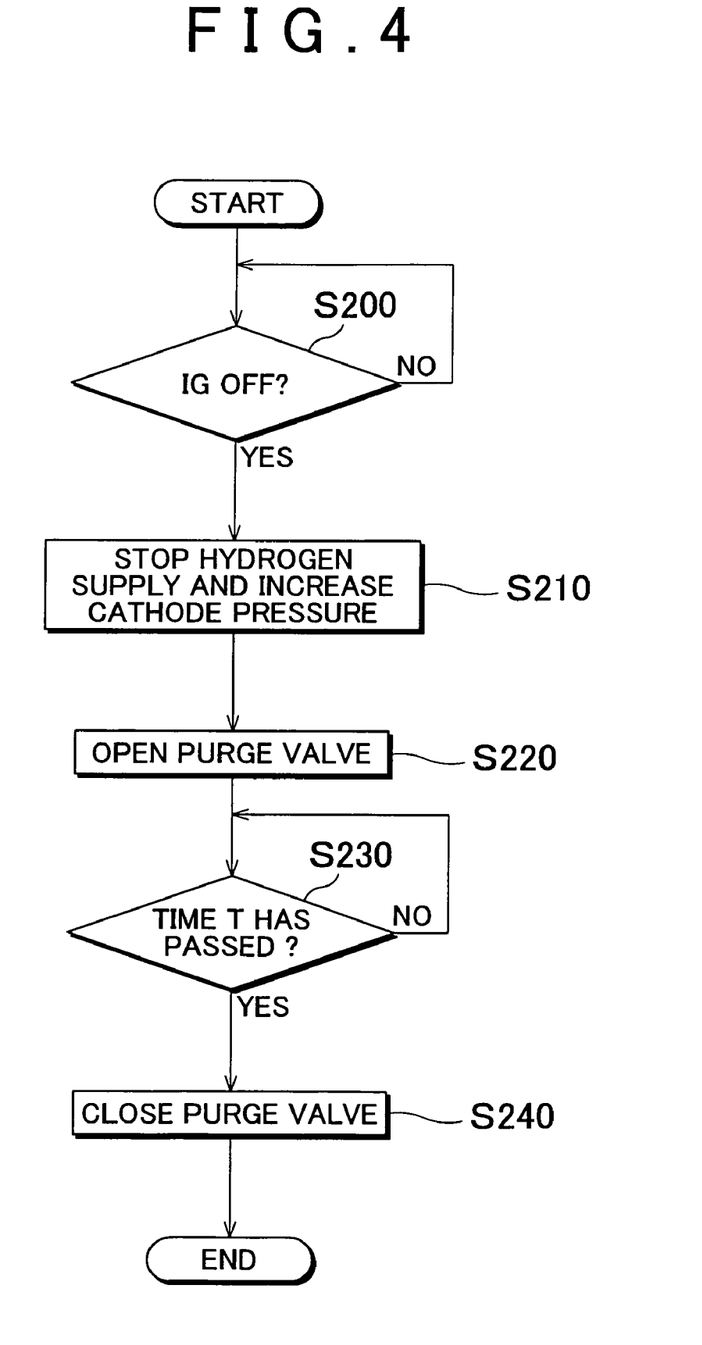
FIG. 4 is a flowchart illustrating the third control routine executed in the fuel cell system of the first example embodiment of the invention.

In the following, the control routines executed in the fuel cell system of the first example embodiment will be described with reference to FIG. 2 to FIG. 4. FIG. 2 to FIG. 4 are flowcharts illustrating the control routines executed in the fuel cell system of the first example embodiment, respectively. Note that these control routines are executed during power generation of the fuel cell unit 10. Hereinafter, the control routines will be described one by one.

The control routine illustrated by the flowchart of FIG. 2 is an example control routine for accomplishing the procedure descried in "Control based on hydrogen concentration" in the operation of the fuel cell system of the first example embodiment. In this control routine, information regarding the hydrogen concentration is first obtained (step S90). In this step, more specifically, hydrogen concentration D representing the concentration of hydrogen in the gas that is presently being discharged to the gas-discharge passage line (not shown in the drawings) is detected from the output of the hydrogen concentration sensor 50.

Subsequently, it is then determined whether the detected hydrogen concentration D is equal to or lower than a reference value that has been predetermined as a reference level of hydrogen concentration in the gas to be discharged (step S92). If it has been determined that the detected hydrogen concentration D is equal to or lower than the reference value, it indicates that the concentration of hydrogen in the gas being discharged to the gas-discharge passage line (not shown in the drawings) is sufficiently low. In this case, therefore, the present cycle of the control routine is finished. On the other hand, if it has been determined that the detected hydrogen concentration is not equal to nor lower than the reference value, the amount of air supplied to the fuel cell unit 10 is increased while the amount of hydrogen supplied to the fuel cell unit 10 is reduced (step S94). In this step, more specifically, the flow rate at the injector 26 is reduced by a given amount while the flow rate at the air compressor 40 is increased by a given amount.

After step S94, the control routine starts again from step S90. That is, the aforementioned processes for reducing the hydrogen concentration are repeatedly executed until the hydrogen concentration in the gas discharged decreases to a sufficiently low level. When it is determined in step S92 that the hydrogen concentration D is equal to or lower than the reference value, the present cycle of the control routine is finished.

According to the control routine described above, as such, it is possible to reduce the hydrogen concentration in the gas discharged to the outside reliably while monitoring the same hydrogen concentration.

The control routine illustrated by the flowchart of FIG. 3 is an example control routine for accomplishing the procedure described in "Adjustment of air supply amount" in the operation of the fuel cell system of the first example embodiment. In the control routine of FIG. 3, the amount of gas passing through the orifice 30 is first calculated (step S100). In this step, for the purpose of determining the amount of gas passing through the orifice 30, the ECU 60 obtains information regarding the present power output (output current) of the fuel cell unit 10.

Next, based on the obtained information, the ECU 60 estimates the pressure in the anode gas passage 12 and the portion of the anode-off gas passage 13 on the upstream side of the orifice 30, that is, the pressure in the portion of the anode passage line on the anode side of the orifice 30. Note that this pressure may be estimated from the state of the pressure adjustment valve 24. Then, the ECU 60 estimates the pressure in the portion of the cathode passage line on the cathode side of the orifice 30. This pressure can be estimated from, for example, the state of the air compressor 40, the state of the pressure adjustment valve 46, and so on. Then, the ECU 60 calculates the amount of gas passing through the orifice 30 based on the estimated pressure in the anode passage line and the estimated pressure in the cathode passage line.

Subsequently, the ECU 60 calculates an air supply amount $V_A$ representing the amount of air required to reduce the hydrogen concentration based on the calculated amount of the gas passing through the orifice 30 (step S110). In the first example embodiment, the characteristic of the air supply amount $V_A$ is empirically formulated such that it is set, in accordance with the amount of gas passing through the orifice 30 at a given time, to such a value that the concentration of hydrogen in the gas at the hydrogen concentration sensor 50 does not exceed an allowable value. Such setting of the air supply amount $V_A$ can be accomplished by the following method, for example. First, a map defining the relation between the amount of gas passing through the orifice 30 and the residual hydrogen concentration in this passing gas is formulated in advance (this map will hereinafter be referred to as "first map"). In operation, the amount of gas passing through the orifice 30 is obtained at a given time, and the amount of hydrogen passing through the orifice 30 at this time is determined by applying the obtained passing gas amount to the first map. It is to be noted that the first map may be corrected based on the temperature in the anode gas passage 12, for example.

Likewise, a map defining the relation between a given hydrogen concentration and the amount of air required to reduce the hydrogen concentration in the gas flowing in the downstream portion of the cathode gas passage 14 to a desired level or lower is formulated (this map will be referred to as "second map"). The first and second maps are stored in the ECU 60. The ECU 60 refer to these maps in step 110 to determine the air supply amount $V_A$, that is, the amount of air required to be supplied to the downstream portion of the cathode gas passage 14.

Next, an air supply amount $V_I$ representing the amount of air required for power generation is calculated (step S120). In this step, more specifically, the air supply amount $V_I$ is set to the amount of air required to produce the presently required power output of the fuel cell unit 10, which the ECU 60 has obtained in step S100. Then, it is determined whether the air supply amount $V_A$ is equal to or larger than the air supply amount $V_I$ (step S130). In this step, that is, the amount of air required to reduce the hydrogen concentration and the amount of air required to produce the required power output of the fuel cell unit 10 are compared with each other.

If it has been determined in step S130 that the air supply amount $V_A$ is equal to or larger than the air supply amount $V_I$, it indicates that the amount of air required to reduce the hydrogen concentration is equal or larger than the amount of air required to produce the required power output of the fuel cell unit 10. In this case, therefore, the air compressor 40 is controlled such that air of the air supply amount $V_A$ is supplied to the fuel cell unit 10 (step S140). On the other hand, if it has been determined in step S130 that the air supply amount $V_A$ is not equal to nor larger than the air supply amount $V_I$, it indicates that the amount of air required to produce the required power output of the fuel cell unit 10 is larger than the amount of air required to reduce the hydrogen concentration. In this case, therefore, the air compressor 40 is controlled such that air of the air supply amount $V_I$ is supplied to the fuel cell unit 10 (step S150). Then, the present cycle of the control routine is finished.

According to the control routine described above, as such, the hydrogen concentration in the gas discharged to the outside can be kept at or lower than the reference value while ensuring that the necessary amount of air for power generation is supplied to the cathode gas passage 14.

The control routine illustrated by the flowchart of FIG. 4 is an example control routine for accomplishing the procedure described in "Control during purging" in the operation of the fuel cell system of the first example embodiment. In the control routine of FIG. 4, it is first determined whether the ignition of the fuel cell unit 10 has been turned off (step S200). If the ignition of the fuel cell unit 10 has not been turned off, it indicates that any request for stopping the operation of the fuel cell unit 10 has not been issued. In this case, step S200 is repeated until such a request is made.

If it is determined in step S200 that the ignition of the fuel cell unit 10 has been turned off, the hydrogen supply to the fuel cell unit 10 is stopped and the cathode pressure is increased (step S210). In this step, more specifically, the ECU 60 outputs certain control signals for closing the injector 26 (i.e., for zeroing the duty ratio for the duty control), and the opening of the pressure adjustment valve 46 is narrowed down, so that the pressure in the cathode passage line increases.

Then, the purge valve 28 is opened (step S220), so that air starts flowing from the cathode side, the pressure at which has been increased by the process in step 210, to the anode side, the hydrogen supply to which has been stopped. This air flow carries the impurities in the anode gas passage 12 to the downstream side of the purge valve 28. Note that before this purging, a process for accelerating hydrogen consumption for power generation may be performed so as to reduce the hydrogen in the anode gas passage 12. Further, note that a diluter may be provided downstream of the purge valve 28.

Next, it is determined whether a time T has passed from when the purge valve 28 was opened (step S230). In this step, more specifically, whether the anode gas passage 12 has been purged adequately is determined by comparing the time that has elapsed from when step S220 was executed with the time T that has been empirically set to a length needed for the anode gas passage 12 to be purged adequately.

If it is determined in step S230 that the time T has already passed, it indicates that the anode gas passage 12 has been purged adequately. In this case, therefore, the purge valve 28 is closed (step S240), after which the present cycle of the control routine is finished. Thus, in this manner, the anode gas passage 12 is purged whereby impurities, such as water, in the anode gas passage 12 are removed therefrom.

In the first example embodiment described above, the fuel cell unit 10 may regarded as "fuel cell" of the invention, the anode structure including the anode gas passage 12 may be regarded as "anode" of the invention, the cathode structure including the cathode gas passage 14 may be regarded as "cathode" of the invention, the anode-off gas passage 13 may be regarded as "gas passage" of the invention, the orifice 30 may be regarded as "orifice" of the invention, and the injector 26 may be regarded as "injector" of the invention.

Further, in the first example embodiment, the hydrogen concentration sensor 50 may be regarded as "detector" of the invention. Further, the ECU 60 that executes the processes of steps S92 and S94 in the flowchart of FIG. 2 may be regarded as "fuel supply amount control portion" of the invention.

Further, in the first example embodiment, the structure in which the portion of the anode-off gas passage 13 downstream of the orifice 30 is connected to the upstream portion of the cathode gas passage 14 may be regarded as a structure recited by "a portion of the gas passage downstream of the orifice is connected to the cathode passage line". Further, in the first example embodiment, the air compressor 40 may be regarded as "air supply mechanism" of the invention, and the ECU 60 that executes the processes of steps S92 and S94 in the flowchart of FIG. 2 may be regarded as "air supply amount control portion" in the invention.

Further, in the first example embodiment, the ECU 60 that executes the processes of steps S100 and S110 in the flowchart of FIG. 3 may be regarded as "first calculation portion" in the invention, and the ECU 60 that executes the process of step S120 may be regarded as "second calculation portion" in the invention, and the ECU 60 that execute the processes of steps S130, S140, and S150 may be regarded as "comparative control portion" in the invention.

Modification Examples of First Example Embodiment

First Modification Example

In the first example embodiment, the downstream portion of the anode gas passage 12 is connected to the upstream side of the cathode gas passage 14 of the cathode passage line. However, the invention is not limited to this structure.

Figure 5:
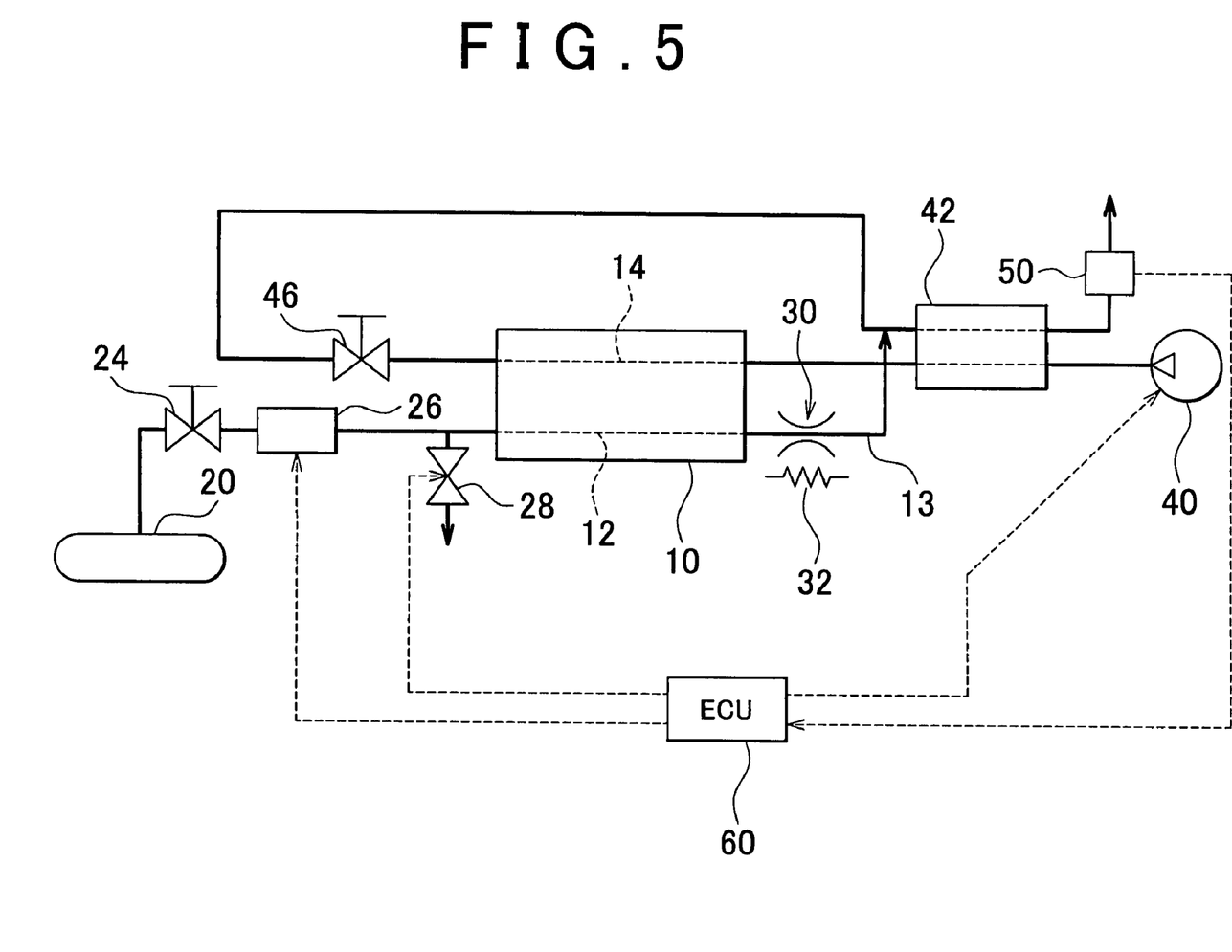
FIG. 5 is a view showing the configuration of a fuel cell system according to a modification example of the first example embodiment of the invention.

FIG. 5 is a view showing the configuration of a fuel cell system according to the first modification example of the first example embodiment of the invention. In this fuel cell system, referring to FIG. 5, the downstream portion of the anode gas passage 12 is connected to the downstream portion of the cathode gas passage 14. The foregoing techniques of the first example embodiment may be applied to this fuel cell system. Note that the fuel cell system of the first modification example is also characterized in that the downstream side of the orifice 30 is connected to a portion of the cathode passage where the pressure is relatively low.

Second Modification Example

In the fuel cell system of the first example embodiment, during the control procedure described in "Control based on hydrogen concentration" above, the air compressor 40 and the injector 26 are both controlled so as to reduce the concentration of hydrogen in the gas discharged to the outside. However, the invention is not limited to this. That is, the hydrogen concentration reduction may alternatively be accomplished by controlling one of the air compressor 40 and the injector 26.

Third Modification Example

In the fuel cell system of the first example embodiment, the concentration of hydrogen in the gas being discharged to the outside is monitored using the hydrogen concentration sensor 50. However, the invention is not limited to this. For example, the concentration of hydrogen in the gas being discharged to the outside may be estimated through given calculation using the power output (output current) of the fuel cell unit 10, the pressure in the anode gas passage 12, the temperature of the fuel cell unit 10, etc.

Further, in the fuel cell system of the first example embodiment, the hydrogen concentration sensor 50 is provided at the downstream end of the cathode passage line. However, the invention is not limited to this. The hydrogen concentration sensor 50 may be provided at any other position downstream of the orifice 30. Alternatively, a hydrogen concentration sensor may be provided at any position in the anode-off gas passage 13. In either case, the concentration of hydrogen in the gas being discharged to the outside is estimated from the hydrogen concentration detected at the position of the hydrogen concentration sensor and the related components are controlled such that the estimated hydrogen concentration becomes equal to or lower than a reference value. Note that "obtain" in the invention include both "detect" and "estimate".

Other Modification Example

The fuel cell system of the first example embodiment may be modified as follows. For example, a humidifier containing catalyst may be used as the humidifier 42 of the fuel cell system of the first example embodiment. In this case, the residual hydrogen reacts also at the humidifier, and the water produced from this reaction can be used for humidification. Further, the diameter of the orifice 30 is not variable in the fuel cell system of the first example embodiment. However, the invention is not limited to this. That is, the diameter of the orifice 30 may be variable. Further, the techniques of the invention may be applied also to a system incorporating a hydrogen-supplying device or mechanism other than an injector, such as a valve having a variable opening. Further, a gas-liquid separator may be provided upstream of the orifice 30 in the anode-off gas passage 13.

Configuration of Second Example Embodiment

In the fuel cell system of the first example embodiment, the downstream side of the anode-off gas passage 13 is connected to the cathode passage line. Meanwhile, the fuel cell system of the second example embodiment has substantially the same configuration of that of the fuel cell system of the first example embodiment except the following. That is, in the fuel cell system of second example embodiment, the anode passage line and the cathode passage line are not connected to each other and the downstream side of the anode-off gas passage 13 communicates with the outside via a diluter, or the like, and the orifice 30 is provided at the anode-off gas passage 13. Note that the configuration of the fuel cell system of the second example embodiment is not shown in any drawing.

In the fuel cell system of the second example embodiment, the hydrogen concentration sensor 50 is provided downstream of the orifice 30, and the injector 26 is controlled in accordance with the output of the hydrogen concentration sensor 50 in the same manner as in the first example embodiment. According to the second example embodiment, as such, the system configuration can be simplified as in the first example embodiment.

In the illustrated example embodiments, the control portions are implemented with general purpose processors. It will be appreciated by those skilled in the art that the control portions can be implemented using a single special purpose integrated circuit (e.g., ASIC) having a main or central processor section for overall, system level control, and separate sections dedicated to performing various different specific computations, functions and other processes under control of the central processor section. The control portions can be a plurality of separate dedicated or programmable integrated or other electronic circuits or devices (e.g., hardwired electronic or logic circuits such as discrete element circuits, or programmable logic devices such as PLDs, PLAs, PALs or the like). The control portions can be suitably programmed for use with a general purpose computer, e.g., a microprocessor, microcontrol portion or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the control portions. A distributed processing architecture can be used for maximum data/signal processing.

What is claimed is:

1. A fuel cell system comprising:
a fuel cell having an anode and a cathode and operable to generate electric power using fuel gas supplied to the anode and cathode gas supplied to the cathode; and
a gas passage in which anode-off gas discharged from the anode flows and which has an orifice, a flow area of the orifice being smaller than a flow area of the gas passage upstream of the orifice, wherein the orifice is configured to discharge less anode-off gas than fuel gas consumed in the anode.

2. The fuel cell system according to claim 1, further comprising:
a fuel supply mechanism provided upstream of the anode and operable to adjust the amount of fuel gas supplied to the anode, wherein
the fuel supply mechanism includes an injector.

3. The fuel cell system according to claim 1, further comprising:
a fuel supply mechanism provided upstream of the anode and operable to adjust the amount of fuel gas supplied to the anode;
a detector that detects the fuel concentration in gas flowing in the gas passage; and
a fuel supply amount control portion that controls the fuel-supply mechanism to adjust the amount of fuel gas supplied to the anode based on the fuel concentration detected by the detector.

4. The fuel cell system according to claim 3, wherein the fuel supply amount control portion is adapted to reduce the amount of fuel gas supplied to the fuel cell such that the fuel concentration detected by the detector becomes equal to or lower than a reference value.

5. The fuel cell system according to claim 1, further comprising:
a cathode passage line including the cathode of the fuel cell and operable to communicate, at one end, with the outside of the cathode passage line, wherein
a portion of the gas passage which is located downstream of the orifice is connected to the cathode passage line.

6. The fuel cell system according to claim 5, wherein a portion of the gas passage on the downstream side of the orifice is connected to a portion of the cathode passage line which is located upstream of the cathode.

7. The fuel cell system according to claim 5, wherein a portion of the gas passage on the downstream side of the orifice is connected to a portion of the cathode passage line which is located in the downstream side of the cathode of the fuel cell.

8. The fuel cell system according to claim 5, further comprising:
an air supply mechanism provided upstream of the cathode and operable to adjust the amount of air supplied to the cathode as the cathode gas;
a detector that detects the fuel concentration in gas flowing in the gas passage; and
an air supply amount control portion that controls the air supply mechanism to adjust the air supply amount based on the fuel concentration detected by the detector such that the fuel concentration in gas discharged from the cathode passage line becomes equal to or lower than a reference value.

9. The fuel cell system according to claim 8, wherein if the detected fuel concentration is higher than the reference value, the air supply amount control portion increases the amount of air supplied via the air supply mechanism.

10. The fuel cell system according to claim 8, further comprising:
a first calculation portion that calculates a first air supply amount that is the amount of air required to be supplied via the air supply mechanism to make the fuel concentration in gas discharged from the cathode passage line equal to or lower than the reference value; and a second calculation portion that calculates a second air supply amount that is the amount of air required to be supplied via the air supply mechanism to produce a required power output of the fuel cell, wherein the air supply amount control portion includes a comparative control portion that controls the air supply mechanism based on a result of comparison between the calculated first air supply amount and the calculated second air supply amount.

11. The fuel cell system according to claim 10, wherein the first calculation portion is adapted to: estimate the pressure in the cathode passage line and the pressure in the anode passage line; determine the amount of gas passing through the orifice based on the estimated pressures; and calculate the first air supply amount based on the determined gas amount.

12. The fuel cell system according to claim 10, wherein the air supply amount control portion is adapted to cause air of the larger of the calculated first air supply amount and the calculated second air supply amount to be supplied to the fuel cell.

13. The fuel cell system according to claim 1, further comprising:
    a fuel supply mechanism provided upstream of the anode and operable to adjust the amount of fuel gas to be supplied to the anode;
    an obtaining portion that obtains the fuel concentration in gas discharged from the fuel cell system; and
    a fuel supply amount control portion that controls the amount of fuel gas supplied via the fuel supply mechanism based on the fuel concentration obtained by the obtaining portion.

14. The fuel cell system according to claim 5, further comprising:
    an obtaining portion that obtains the fuel concentration in gas discharged from the fuel cell system; and
    a control portion that adjusts at least one of the amount of fuel gas supplied to the fuel cell and the amount of cathode gas to be supplied to the fuel cell based on the fuel concentration obtained by the obtaining portion.

15. The fuel cell system according to claim 5, further comprising:
    an air supply mechanism provided upstream of the cathode and operable to adjust the amount of air to be supplied to the cathode as cathode gas;
    a determining portion that determines whether it is necessary to purge an anode-gas passage, the anode-gas passage including an anode-off gas passage located upstream of the orifice; and
    an air supply amount control portion that controls the air supply mechanism to increase the amount of cathode gas supplied to the fuel cell when the determining portion has determined that it is necessary to purge the anode-gas passage.

16. The fuel cell system according to claim 1, wherein the cathode gas is air.

17. The fuel cell system according to claim 1, further comprising a heater provided at the orifice.

18. The fuel cell system according to claim 1, wherein the orifice has a fixed diameter.

19. The fuel cell system according to claim 3, wherein the detector is disposed downstream of the cathode.

* * * * *